United States Patent Office 3,703,579
Patented Nov. 21, 1972

3,703,579
COMPOSITIONS FOR INHIBITING ANOMALOUS DEPOSITION AND MOBILIZATON OF CALCIUM PHOSPHATE IN ANIMAL TISSUE
James S. Widder, Springfield Township, Hamilton County, Ohio (% The Procter & Gamble Company, Miami Valley Laboratories, P.O. Box 39175, Cincinnati, Ohio 45239)
No Drawing. Filed Oct. 30, 1970, Ser. No. 85,804
Int. Cl. A61k 27/00
U.S. Cl. 424—128
5 Claims

ABSTRACT OF THE DISCLOSURE

Compositions for inhibiting anomalous deposition and mobilization of calcium phosphates in animal tissue, comprising an effective amount of certain ammonium salts of condensation products of ammonia and phosphorus in a pharmaceutical carrier; and a method for treating conditions involving pathological calcification and hard tissue demineralization in an animal comprising administering to such animal said compositions.

BACKGROUND OF THE INVENTION

This invention relates to novel compositions having therapeutic and/or prophylactic effects. The invention further relates to a novel method for treating or preventing certain pathological conditions in animals.

A number of pathological conditions which can afflict warm-blooded animals involve abnormal calcium and phosphate metabolism. Such conditions may be divided into two broad categories.

(1) Conditions which are characterized by anomalous mobilization of calcium and phosphate leading to general or specific bone loss or excessively high calcium and phosphate levels in the fluids of the body. Such conditions are sometimes referred to herein as pathological hard tissue demineralizations.

(2) Conditions which cause or result from deposition of calcium and phosphate anomalously in the body. These conditions are sometimes referred to herein as pathological calcifications.

The first category includes osteoporosis, a condition in which bone hard tissue is lost disproportionately to the development of new hard tissue. Marrow and blood spaces become larger, fibrous binding decreases, and compact bone becomes cancellous and fragile. Osteoporosis can be subclassified as menopausal, senile, drug induced (e.g., adrenocorticoid as can occur in steroid therapy), disease induced (e.g., arthritic and tumor), etc., however, the manifestations are essentially the same. Another condition in the first category is Paget's disease (osteitis deformans) which is also characterized by bone loss. In this disease, dissolution of normal bone occurs which is then replaced by soft, poorly mineralized tissue such that the bone becomes deformed from pressures of weight bearing, particularly in the tibia and femur. This condition also frequently sponsors pathological deposition of calcium and phosphate.

The second category, involving conditions manifested by anomalous calcium and phosphate deposition, includes such afflictions as arthritis, neutritis, bursitis, tendinitis, and other inflammatory conditions which predispose involved tissue to deposition of calcium phosphates, and hormonal imbalance, e.g., hyperparathyroidism, myositis ossificans progressiva, calcinosis universalis, resulting in calcification of soft tissues. Atherosclerosis is another condition in this category and involves degeneration and proliferate change in the intima which produces fibrous, lipoid plaques. If such plaques calcify, or if the inner walls of the arteries accumulate plaque and calcify, this condition is commonly referred to as arteriosclerosis.

Yet another condition in category (2) which results from anomalous calcium and phosphate deposition is stone or calculi formation in the bile duct, gall bladder, pancreas, salivary glands, tonsils, kidneys and bladder. Although some of such stones are not comprised primarily of calcium phosphate, it is likely that the orginal nidus is calcium phosphate. The formation of urinary calculi, i.e., urolithiasis, in cattle and sheep constitutes a major problem in veterinary medicine. It is estimated that from 5% to 10% of weanling calves suffer this affliction when they are taken off milk and start taking in other fluids.

As far as is known, no satisfactory medical treatment for the conditions of category (1) as described above has been developed prior to this invention although dietary control, fluorides, chelators such as EDTA, and the hormone calcitonin (thyrocalcitonin) have been suggested or used for these conditions. Although certain inorganic phosphates such as pyrophosphates and longer chain condensed phosphates have been suggested for treatment of conditions in category (2), they have not been widely used because of their tendency to hydrolyze to the ineffective orthophosphate when administered to larger animals such as humans and cattle.

Various organic polyphosphonates have been shown to be effective in inhibiting anomalous deposition and mobilization of calcium phosphate as is disclosed in the copending application of Marion D. Francis, Ser. No. 775,-203, filed Nov. 12, 1968 now abandoned; however, researchers continue to seek effective alternatives.

It is therefore an object of this invention to provide a composition for inhibiting anomalous deposition and mobilization of calcium phosphate in animal tissue.

It is a further object of this invention to provide an improved method for treatment of conditions involving pathological calcification and hard tissue demineralization in animals.

SUMMARY OF THE INVENTION

This invention is based on the discovery that certain ammonium salts of condensation products of ammonia and phosphorus (as hereinafter defined) inhibit calcium hydroxylapatite crystal growth and thereby reduce anomalous mobilization and deposition of calcium phosphates in animals. The invention thus involves a composition and method for inhibiting pathological demineralization of bony tissue and pathological calcium deposition in the soft tissue of animals. In its method aspect, the invention comprises administering to said animals an effective amount of the condensation product as hereinafter characterized.

DETAILED DESCRIPTION OF THE INVENTION

In one of its aspects, this invention is a composition comprising an effective but non-toxic amount of an ammonium salt of a condensation product of ammonia and phosphorus of the structural formulae:

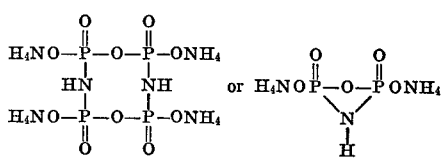

and a pharmaceutical carrier.

The condensation product which comprises the active ingredient of the present compositions as well as a method for their preparation are more fully described in U.S.

Patent 2,122,122. They are commercially available from the Stauffer Chemical Company under the trademark "Victamide" and are hereinafter referred to by this designation.

The required dosage of Victamide will vary with the particular condition being treated, the severity of the condition, and the duration of treatment; however, single dosages can range from 0.01 to 500 mg. per kilogram of body weight, preferably 0.1 to 50 mg./kg., with up to four dosages daily. The higher dosages within this range are, of course, required in the case of oral administration because of limited absorption. Dosages greater than about 500 mg./kg. may produce toxic symptoms and should be avoided. Moreover, daily dosages greater than about 2000 mg./kg. (unless otherwise specified, the unit designated "mg./kg." as used herein refers to mg. of compound/kg. of body weight) are not required to produce the desired effect may produce toxic side effects. Dosages of less than about .01 mg./kg. do not materially affect pathological calcification or demineralization, even administered intravenously. Table 1 below sets forth preferred dosages for various conditions which can be treated in accordance with this invention.

TABLE 1

| Condition: | Oral dosage (mg./kg.) up to four times/day |
|---|---|
| Osteoporosis (menopausal)[1] | 1–25 |
| Osteoporosis (senile et al.) | 1–25 |
| Paget's disease | 5–50 |
| Arthritis | 1–25 |
| Bursitis | 1–25 |
| Neuritis | 1–25 |
| Stones | 1–25 |

[1] A larger initial dosage may be required, e.g. ,up to 500 mg./kg. followed by the specified dosage level.

The Victamide can also be administered parenterally in aqueous solution by subcutaneous, intradermal, intramuscular, intraperitoneal, or intravenous injection. The preferred single dosage ranges by these modes of administration are as follows:

| | Mg./kg. |
|---|---|
| Subcutaneous | 0.1–10 |
| Intradermal | 0.1–10 |
| Intramuscular | .05–5 |
| Intravenous | .05–5 |
| Intraperitoneal | .05–5 |

For purposes of oral administration Victamide can be formulated in the form of capsules, tablets or granules. For treatment of non-human animals, the Victamide is preferably incorporated in animal feed, feed supplements or feed concentrates. They can also be prepared in unit dosage form together with a pharmaceutical carrier, each unit dosage form containing from 15 mg. to 10 g. of Victamide. The preferred concentration range of Victamide in unit dosage forms intended for use by humans and smaller domesticated animals is from 15 mg. to 1000 mg., more preferably 100 mg. to 500 mg. A higher concentration range, i.e., from 1 g. to 5 g., is preferred in unit dosage forms intended for treatment of larger animals such as cattle, horses, etc.

When administered orally, the compositions of this invention are preferably in a form adapted to minimal exposure of the Victamide to the oral cavity. Although these compounds do not damage dental enamel when applied to the tooth surfaces at the relatively low concentrations typical of toothpaste, mouthwash, lozenges and the like intended for dental calculus prophylaxis, the substantially higher concentrations of Victamide provided in the unit dosage form embodiments of this invention may demineralize dental enamel on repeated prolonged exposure. Thus oral administration is preferably effected with such unit dosage forms as capsules, pills, and tablets which are promptly ingested. Troches, chewable tablets and the like which typically remain in the oral cavity for a substantial time prior to ingestion are preferably avoided.

As used herein, the term "pharmaceutical carrier" denotes a solid or liquid filler, diluent or encapsulating substance. Some examples of the substances which can serve as pharmaceutical cariers are sugars such as lactose, glucose and sucrose; starches such as corn starch and potato starch; cellulose and its derivatives, such as sodium carboxymethylcellulose, ethylcellulose, cellulose acetate; powdered tragacanth; malt; gelatin; talc; stearic acid; magnesium stearate; calcium sulfate; vegetable oils, such as peanut oil, cottonseed oil, sesame oil, olive oil, corn oil and oil of theobrama; polyols such as propylene glycol, glycerin, sorbitol, mannitol, and polyethylene glycol; agar; alginic acid; pyrogen-free water; isotonic saline; and phosphate buffer solutions, as well as other non-toxic compatible substances used in pharmaceutical formulations. Wetting agents and lubricants such as sodium lauryl sulfate, as well as coloring agents, flavoring agents and preservatives, can also be present.

The pharmaceutical carrier employed in conjunction with the Victamide is used at a concentration sufficient to provide a practical size to dosage relationship. Preferably, the pharmaceutical carrier comprises from about 0.1% to 99% by weight of the total composition.

While it is not intended that this invention be limited by a particular theory of operation, in the case of those conditions which cause or result from deposition of calcium and phosphate anomalously in the body, it is believed that Victamide interferes with the conversion of X-ray amorphous calcium phosphate to crystalline calcium hydroxylapatite and thus greatly reduce or prevent the formation of calcium phosphate deposits. Although certain inorganic phosphates also inhibit crystal growth, they are hydrolyzed soon after administration to the orthophosphate species which has no crystal growth inhibition properties and, in fact, can itself take part in hydroxylapatite formation. The Victamide, on the other hand, does not hydrolyze to inactive forms and remain active after administration even to large animals such as cattle.

CRYSTAL GROWTH INHIBITION DETERMINATION

The efficacy of Victamide in inhibiting crystal growth was demonstrated by the Crystal Growth Inhibition Determination which is conducted as follows:

1 ml. of a 0.1 M stock solution of $NaH_2PO_4 \cdot H_2O$ is diluted with 22 ml. of distilled water. 1 ml. of an aqueous solution of Victamide at a concentration sufficient to provide the desired ultimate concentration in the reaction mixture is added to the diluted $NaH_2PO_4$ solution and the solution is adjusted to pH 7.4 with sodium hydroxide. To this solution is added 1 ml. of a 0.1 M solution of $CaCl_2 \cdot 2H_2O$ pre-adjusted to pH 7.4 with sodium hydroxide. This mixture is held at a constant pH 7.4 throughout the reaction period.

After a sufficient reaction time as determined by the operator, generally within 90 minutes, the solution is filtered through a 0.45 Millipore filter pad. The precipitate is air-dried and analyzed by X-ray diffraction. The solid calcium phosphate precipitated from the above-described solution without Victamide gives a typical hydroxylapatite pattern, while the calcium phosphate precipitated under the same conditions but in the presence of small amounts of Victamide is amorphous to X-rays.

When tested in the above-described manner Victamide was found to inhibit crystal growth at a concentration of 15.3 p.p.m.

The capacity of Victamide to inhibit anomalous calcification is also demonstrated in vivo as follows:

This test is based on the observation that massive dosages of vitamin $D_3$ induces extensive calcification in the aorta of rats [see Gillman et al., J. Exp. Path., 40:1 (1960)]. Female Wister rats each weighing 150 to 200 g. are randomly divided into a control group of 60 animals and test groups each containing 10 animals. The animals are kept in a thermostabilized room at 22° C. and receive a normal diet and tap water ad libitum throughout the test period. All of the animals are given daily does of 75,000 units/kg. of vitamin $D_3$ via stomach tube for five days beginning on the third and ending on the seventh day of the test. Beginning on the first day (prior to the first dosage of vitamin $D_3$) until the conclusion of the test, the test groups of animals are administered specified dosages of Victamide, orally by stomach tube or subcutaneously, respectively, once per day. In each case the Victamide is dissolved in 0.9% NaCl when given at the lower dosages, and in distilled water when given at higher dosages. The solution is adjusted to pH 7.4 and the amount of solution given is 2 ml./kg. of body weight. On the fifteenth day, the animals are sacrificed and their aortas are dissected and dried for 48 hours at 120° C. After determination of the dry weight, the aortas are ashed in a muffle oven at 800° C. for six hours. The residue is dissolved in 0.2 N HCl and the calcium is titrated with EDTA using calcichrome as an indicator in a titration photometer, all in accordance with the methods described by Irving et al., Proc. Soc. Exp. Biol. Med., 122, #3, 852 (1966).

The calcium values secured in this test reveal that Victamide materially reduce vitamin $D_3$-induced calcification in the aorta of rats.

Example I

Capsules are prepared by conventional methods, comprised as follows:

| Ingredients: | Mg. per capsule |
|---|---|
| Victamide | 700.00 |
| Starch | 55.60 |
| Sodium lauryl sulfate | 2.90 |

The above capsules administered orally twice daily substantially reduce bone decalcification in a patient weighing approximately 70 kilograms afflicted with osteoporosis.

Example II

Tablets are prepared by conventional methods, formulated as follows:

| Ingredients: | Mg. per tablet |
|---|---|
| Victamide | 250.00 |
| Lactose | 40.00 |
| Starch | 2.50 |
| Magnesium stearate | 1.00 |

When administered orally four times daily, the above composition significantly reduces the formation of renal calculi in a patient weighting approximately 50 kilograms, having a predisposition to such formation.

The lactose employed in this example is replaced by sucrose and the magnesium stearate by sodium carbonylmethyl-cellulose without affecting the desired properties of the tablet.

Solutions for parenteral administration are prepared by dissolving Victamide in distilled water at concentrations of 5, 10, 15 and 25 mg./ml., respectively, to pH 7.4 with HCl, and sterilizing same by standard techniques.

The parenteral solutions when administered by injection to animals in an amount sufficient to provide recommended dosage levels as hereinbefore specified substantially reduce pathological calcification and hard tissue demineralization. Preferably, the solutions are packaged in sealed ampules for single dosage hypodermic injections.

Example IX

A complete feed composition embodying the present invention is prepared by grinding and mixing the following:

| Component: | Parts by weight |
|---|---|
| Timothy hay | 960 |
| Dehydrated alfalfa | 40 |
| Yellow corn | 600 |
| Corn starch | 310 |
| Iodized salt | 10 |
| Bone meal | 20 |
| Sea salt | 1.3 |
| Soybean meal | 30 |
| Biuret | 28 |
| Victamide | .70 |

This composition is fed to 400 pound weanling steers at a rate of approximately 12 pounds per day. Animals placed on this feed experience a substantially lower incidence of urolithiasis than control animals receiving the same feed but without the Victamide.

Example X

A supplementary feed concentrate is prepared by intimately admixing the following:

| Component: | Parts by weight |
|---|---|
| Biuret | 400 |
| Brewer's dried grains | 33 |
| Dehydrated alfalfa | 53 |
| Iodized salt | 10 |
| Tricalcium phosphate | 2.4 |
| Victamide | 1.6 |

This composition is suitable for mixing with silage, grain, hay, ground grain and the like for preparing total feed compositions for ruminant livestock. When fed as a supplement to legumes consumed by grazing weanling lambs at the rate of 0.25 pound per day, this supplement greatly reduces the incidence of urolithiasis.

What is claimed is:

1. A method for treating Paget's disease comprising systemically administering to an animal afflicted therewith an effective but non-toxic amount of an ammonium salt of a condensation product of ammonia and phosphorus having the structural formula:

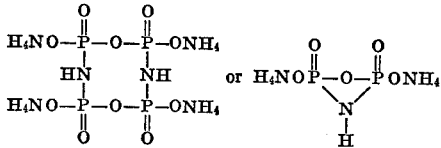

2. A method for treating osteoporosis comprising administering to an animal afflicted therewith an effective but non-toxic amount of an ammonium salt of a condensation product of ammonia and phosphorus having the structural formula:

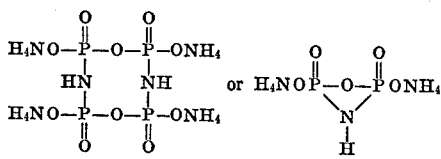

3. A method for treating arthritis comprising administering to an animal afflicted therewith an effective but non-toxic amount of an ammonium salt of a condensation product of ammonia and phosphorus having the structural formula:

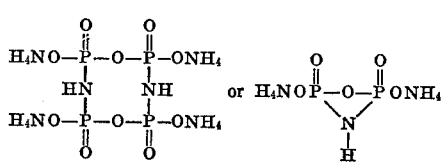

4. A method for treating urolithiasis comprising administering to an animal afflicted therewith an effective but non-toxic amount of an ammonium salt of a condensation product of ammonia and phosphorus having the structural formula:

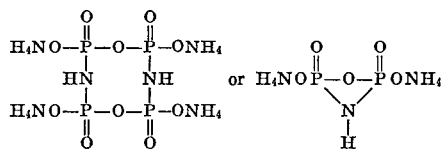

5. A method for treating arteriosclerosis comprising administering to an animal afflicted therewith an effective but non-toxic amount of an ammonium salt of a condensation product of ammonia and phosphorus having the structural formula:

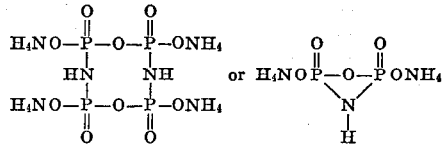

References Cited

McClure: Journal of Dental Research, vol. 42, No. 2, pp. 693–699, March-April 1963.

RICHARD L. HUFF, Primary Examiner